June 14, 1966 J. B. ROSSO 3,256,482
BASIC SEDIMENT AND WATER MONITOR UTILIZING A PLURALITY
OF SELECTABLE COMPENSATING CAPACITORS IN A
RESONANT DETECTING CIRCUIT
Filed Feb. 23, 1962
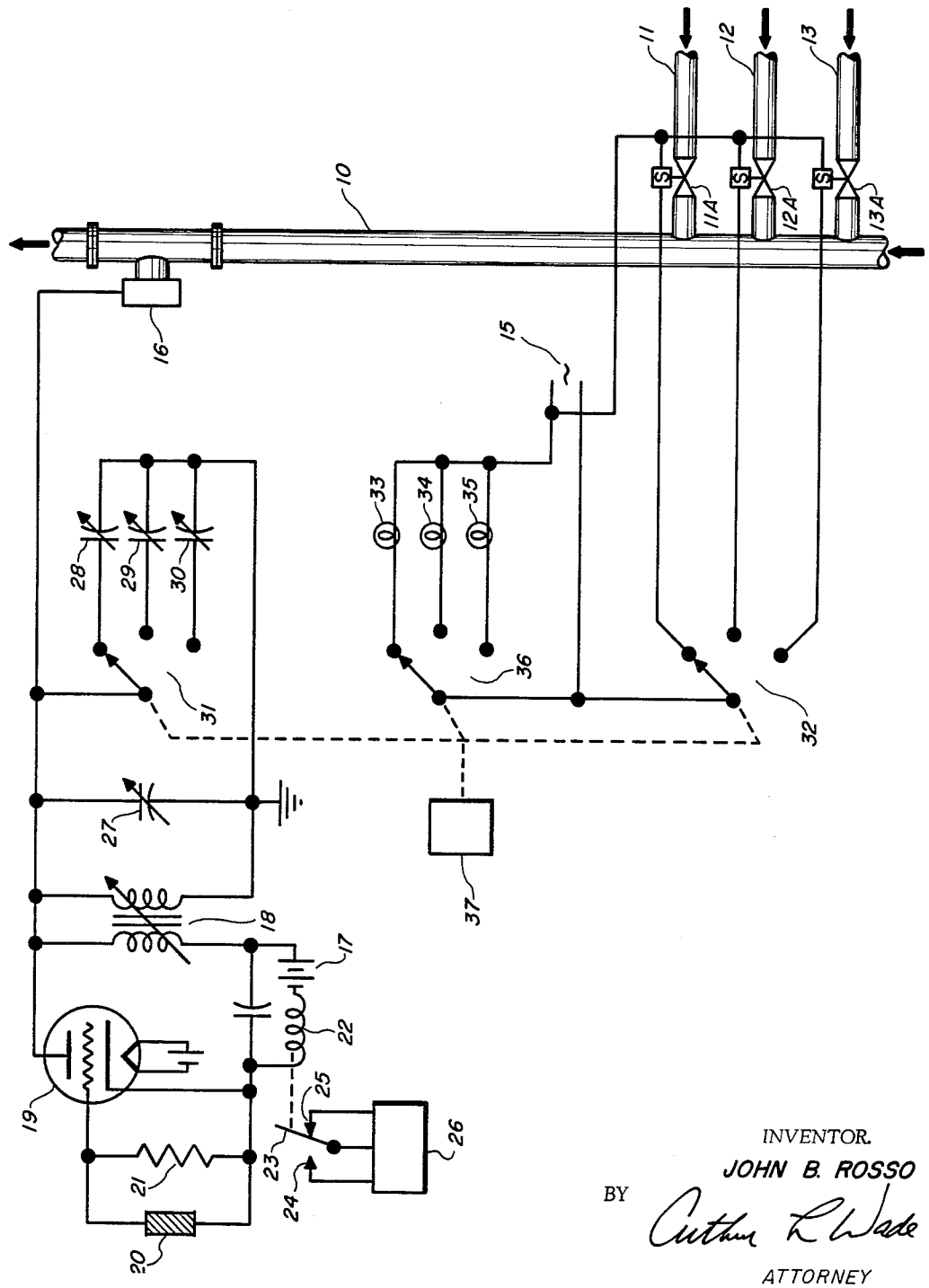
INVENTOR.
JOHN B. ROSSO
BY
ATTORNEY

United States Patent Office 3,256,482
Patented June 14, 1966

3,256,482
BASIC SEDIMENT AND WATER MONITOR UTILIZING A PLURALITY OF SELECTABLE COMPENSATING CAPACITORS IN A RESONANT DETECTING CIRCUIT
John B. Rosso, Tulsa, Okla., assignor to National Tank Company, Tulsa, Okla., a corporation of Nevada
Filed Feb. 23, 1962, Ser. No. 175,004
1 Claim. (Cl. 324—61)

The present invention relates to a measuring instrument for manifesting the basic sediment and water in a plurality of types of oil well production. More particularly, the invention relates to biasing the electric circuit of a measuring instrument each time the instrument is subjected to measuring the basic sediment and water of a selected type of oil well production.

For many years now, the most acceptable instruments used in the oil field to detect and manifest BS & W in oil well production have employed a circuit disclosed in United States Patent, Gunst et al., 2,720,624 issued October 11, 1955. The assignee of this patent has licensed many manufacturers. The basic circuit is well known and accepted generally as suitable to indicate the dielectric constant of production corresponding to a predetermined percent of BS & W in the production.

The primary element of this measuring circuit of the BS & W monitor is a condenser, or capacitor. This condenser is commonly referred to as the probe and is essentially two plates between which the oil well production is passed. The dielectric constant of the production fluids from a particular formation remains substantially the same; changes in measurement are brought about when the BS & W content varies in the production. The condenser probe responds to these changes by the change of its capacitance output. The circuit basically disclosed in Gunst et al. responds to this capacitance output to manifest the percentage of BS & W in the production passing through the probe.

The many programs of centralizing control of oil well production have made it economically desirable to utilize a single measuring instrument to detect varying conditions in a plurality of oil well productions. With the BS & W monitor, production fluids from different areas can be shuttled through the probe as a primary element and a manifestation of the BS & W in these productions manifested by the single instrument. However, there is a problem of calibration as different types of crude oil are passed through a single primary element. There is a variation of the dielectric constant of crude oil taken from different formations and areas. To use a single BS & W monitor, and have it respond accurately to the BS & W content of different types of production, it is necessary to change the calibration of the monitor each time a new production fluid is scanned.

The principal object of the present invention is to sequentially detect the BS & W content of each of a series of different types of oil well production without recalibration of the measuring instrument each time the BS & W content of one of the different types of crude oil is detected in the production.

Another object is to change the capacitance of a primary element system responsive to the BS & W content of oil well production each time the BS & W content of production is detected which production has oil of a known dielectric constant.

Another object is to automatically control the sequence in which a series of production liquids are passed to a primary element of a measuring instrument manifesting the BS & W in the liquids and simultaneously control the sequence in which capacitance is added to or subtracted from the system including the primary element to compensate for the changes in dielectric constant from one type of crude oil to another in the production.

The present invention contemplates a condenser as a primary element through which various types of oil well production liquids are passed. Each time a predetermined one of the types of production is passed through the condenser, a preset condenser is connected in parallel with the primary element condenser to keep the total capacitance of the two condensers and each of the various types of oil well production liquids at a predetermined value. Having maintained the basic calibration of the scanning monitor, the values of BS & W content of each type of production liquid are accurately manifested.

The invention also contemplates the system including a multideck switch which will control the type of fluid passed through the primary element condenser at the same time the correct condenser is connected to the primary element condenser.

Other objects, advantages and features of this invention will become apparent to one skilled in the art upon consideration of the written specification, appended claim, and attached drawing, wherein;

The single drawing figure shows, somewhat diagrammatically, a complete system embodying the present invention.

The drawing illustrates structure embodying the complete invention. Oil well production flows through manifold conduit 10. The production flowing into manifold conduit 10 comes from a number of wells, producing from different zones. Each zone has oil of a particular dielectric constant, different from the other oils and predetermined for the purposes of applying the present invention.

Each type of production is produced into a separate branch conduit. A plurality of branch conduits are represented at 11, 12 and 13. In each conduit, a valve is positioned to determine when that production will be selected for flow through manifold 10. For the present purpose, these valves are represented as simple, solenoid-operated, two-position valves 11A, 12A, and 13A. When the power supply 15 is applied to each of these valves, the production from the conduit flows into manifold 10.

A primary element 16, in the form of a condenser with two plates, is positioned in conduit 10, downstream of the connection between conduits 11, 12 and 13 in conduit 10. This primary element, is commonly referred to as a probe, and the produced fluid flows between its plates. The dielectric constant of oils and water differs so much that the capacitance value of probe 16 becomes a reliable index of the basic sediment and water content of oil well production.

Condenser-probe 16 is connected in a crystal-oscillator circuit of a kind which undergoes a large step in the D.C. plate current of its vacuum tube, which step effects operation of a relay employed for actuating an indicator, alarm, recorder, or any other desired exhibiting means.

The value of capacitance input (from the probe 16)

at which the D.C. plate current step takes place, i.e. the operating point, may be adjustably shifted to lie at any desired point within a substantial range, termed the operating range. The magnitude of the D.C. plate current is substantially independent of the position of the operating point within the operating range. The capacity value at the operating point is termed the critical capacitance and the sensitivity of the apparatus at this point is called the critical sensitivity.

The present invention automatically establishes a single operating point for various types of production flowing to probe 16 from conduits 11, 12, 13 when each type of production contains the same percentage of BS & W. Therefore, the critical capacitance value at the operating point may change, due to dielectric constant change from type to type of oil, but a constant reference is maintained by the present invention, so that a single setting may be maintained to determine when any one of a number of production types scanned has its BS & W content exceed a predetermined value. The inclusion of a capacity unit in the circuit for each type of oil carries out the invention.

The circuit, including probe 16, is disclosed in at least United States Patent, Gunst et al., 2,720,624 which issued October 11, 1955. This is a crystal-controlled vacuum tube circuit. Specifically, a power supply 17 energizes the circuit which includes an adjustable transformer 18; oscillating type tube 19; a crystal 20 in the grid circuit of the tube; and a grid resistor 21 having a very high resistance. The input to the circuit comes from probe 16, through transformer 18.

The complete circuit is tunable, oscillating at a frequency controlled by the natural frequency of crystal 20. Ordinarily, crystal 20 is of quartz, although other types of crystal can be used. The grid resistor 21 is very high in value, making it possible to extend the oscillating range of the circuit to very low values of plate tuning capacitance, or to corresponding high values of inductance. It is well known that a large decrease or increase in plate D.C. current occurs when the circuit goes into, or out of, oscillation, due to an increase or decrease of capacitance as compared to inductance.

Relay coil 22 is connected in series with power source 17. The relay armature is indicated at 23 and its associated contacts 24 and 25, and these may lead to an exhibiting device, which may, for example, be an indicator, alarm, recorder, or controller as desired. Such responsive device is represented at 26.

The input to the oscillating circuit has been described as the capacitance of probe 16. Actually, the capacitance is only partially that of probe 16. A capacitance 27 is placed in parallel with probe 16 and therefore becomes a part of the input to the circuit. The system can be controlled by adjusting capacitance 27 from responsive device 26 to keep the circuit oscillating by adding, or subtracting, capacitance from the total input.

The present invention extends this concept of adding, or subtracting, capacitance to the circuit. Capacitance values are predetermined and then included in the input when a predetermined production is passed through probe 16. Assuming the same value of BS & W in each type production, the operating point remains the same. Therefore, the percent BS & W in each production can be manifested by the one responsive device 26.

A number of predetermined capacitance elements 28, 29 and 30 are disclosed. One plate of each capacitor is attached to the common ground connection of the circuit. Each of the second plates of the capacitors is attached to a contact of a switch deck 31. The switch arm of deck 31 is rotated from connection with capacitor 28, as shown, to contact with capacitors 29 and 30. The switch arm of deck 31 is connected to the other side of the input circuit so each capacitor will be, in turn, placed in parallel with probe 16.

Each of capacitors 28, 29 and 30 is indicated as adjustable. This adjustment feature is shown to emphasize that each capacitor is individually sized in value. Each capacitor is carefully calibrated, or sized, to the type of production flowing to probe 16 from conduits 11, 12, 13. When all capacitors are properly set in size, they will be sequentially included in the input of the circuit to give the desired operating point. Switch deck 31 is actuated to include the proper capacitor in the input at the proper time.

The proper time to include a predetermined capacitor in the input is when the proper type of production is flowed into conduit 10 and through probe 16. The production type is selected by actuation of one of valves 11A, 12A, 13A. Switch deck 32 connects each of the valves to supply 15 in turn.

Switch decks 31 and 32 are actuated together so production type and capacitor value can be simultaneously selected. At the same time the selection of valve and capacitor is made, one of lights 33, 34, 35 is energized by connection to source 15. These lights can be placed on a panel, with suitable legends to guide operators checking on the function of the selecting system. Switch deck 36 sequentially energizes the lights.

Operating mechanism 37 operates the three switch decks together. A mechanical connection is indicated with which the decks are simultaneously rotated from one to the next of their contacts. Mechanisms 37 can be operated on a time-cycle basis, manually, or in any manner desired which will match capacitor valve and light in causing device 26 to manifest the BS & W of the productions.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawing is to be interpreted as illustrative and not in a limiting sense.

The present invention having been described, what is claimed is:

A monitor system for manifesting the basic sediment and water content of oil well production including,
- a conduit connected to a plurality of wells which produce oil from different zones, each oil having a particular dielectric constant,
- a valve system between the wells and the conduit controlled to select the oil from the wells which will flow through the conduit,
- an electric condenser mounted in the conduit so each selected oil flowing through the conduit will flow through the plates of the condenser,
- a circuit connected to include the condenser as a primary element so the circuit will manifest the capacitance value of the condenser as the percentage of basic sediment and water in a selected oil flowing through the plates of the condenser,
- a plurality of compensating condensers, each condenser so sized that when a first of the condensers is connected in parallel to the primary element condenser a first of the selected produced oils through the primary element will cause the manifestation of the circuit to equal the manifestation of the circuit when a second of the compensating condensers is connected in parallel to the primary element condenser while a second selected produced oil is passed through the primary element condenser, both oils having the same percentage of basic sediment and water, but different basic dielectric constants, and a switch arranged to connect the compensating condensers in parallel with the primary element condenser in a predetermined sequence and to simultaneously control the valves to select an oil produced from the wells which will flow through the conduit, the compensating condenser connected and the oil selected corresponding so that the manifestation of the circuit will be constant only with respect to the variations of basic dielectric constant between the produced oils.

References Cited by the Examiner

UNITED STATES PATENTS

| | | | |
|---|---|---|---|
| 2,406,192 | 8/1946 | Cantrell | 137—262 X |
| 3,066,529 | 12/1962 | Warren | 324—61 X |
| 3,142,985 | 8/1964 | Seaver | 324—61 X |

WALTER L. CARLSON, *Primary Examiner.*

J. P. O'BRIEN, E. E. KUBASIEWICZ,
*Assistant Examiners.*